Feb. 13, 1940.    H. A. SMITH    2,190,176
PROCESS FOR THE MANUFACTURE OF A FEED MATERIAL FROM LETTUCE
Filed Aug. 13, 1937
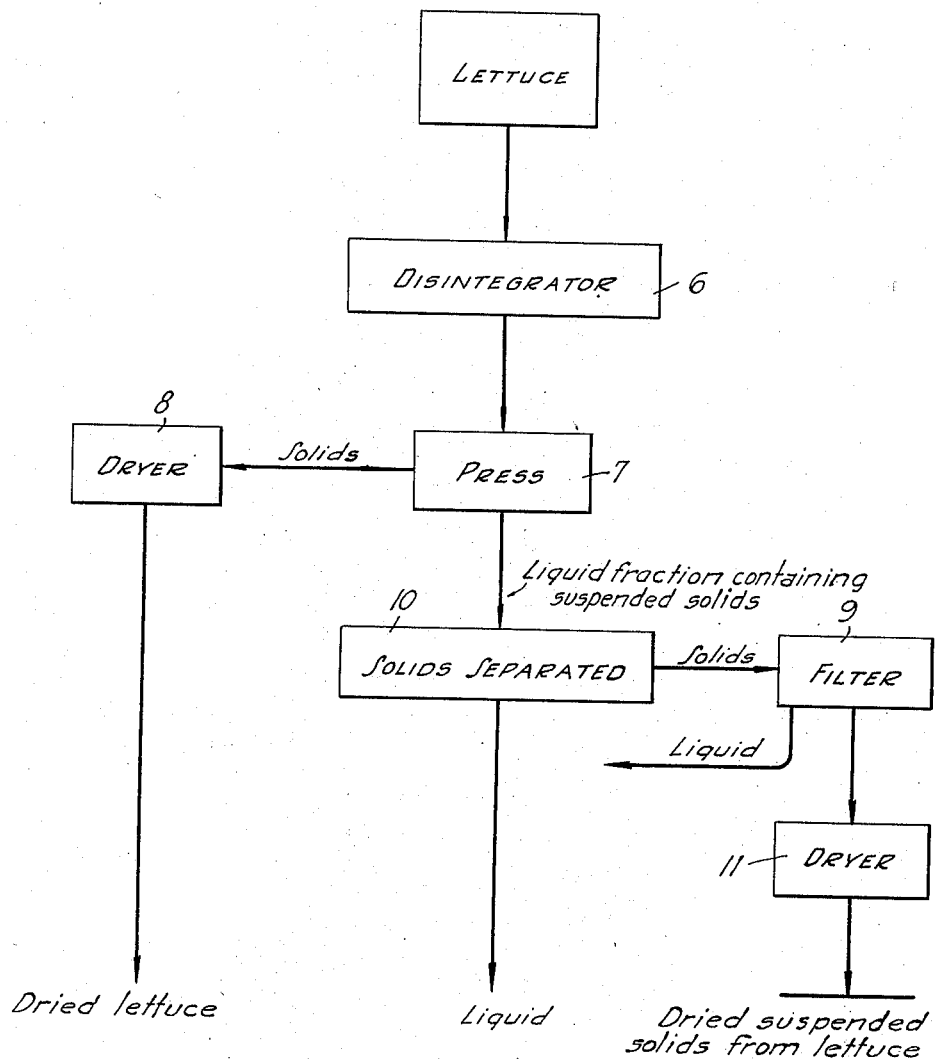
INVENTOR.
Henry A. Smith
BY Robert H. Eckhoff
ATTORNEY.

Patented Feb. 13, 1940

2,190,176

UNITED STATES PATENT OFFICE 2,190,176

PROCESS FOR THE MANUFACTURE OF A FEED MATERIAL FROM LETTUCE

Henry A. Smith, Berkeley, Calif., assignor, by mesne assignments, to National Oil Products Co., Harrison, N. J., a corporation of New Jersey Application August 13, 1937, Serial No. 158,892

4 Claims. (Cl. 99—2)

This invention relates to a method of producing from lettuce a new and useful feed for cattle and the like.

At the present time, packing operations on lettuce are such as to produce a waste material of outside leaves, stem portions, and cull heads. In the Salinas Valley lettuce field alone the production of this waste material amounts to approximately 175,000 tons per year. So far, no economic utilization of this material has been possible and the lettuce packing shed operators pay to have the material hauled away as waste.

I have determined that this lettuce can be made into a suitable feed for animals, poultry and the like, one having a high value because of its considerable protein and fat content.

I have found that lettuce can be suitably disintegrated in a vertical hammer mill, such a mill being known as a Reitz disintegrator. Upon feeding lettuce into such a mill, the lettuce is thoroughly disintegrated, being torn apart with many of the cells in the lettuce being broken open leaving the residue in a suitable condition for dewatering. Upon separating the solid from the liquid residue, the liquid fraction recovered has a suspended solid content. I have found that this solid content can be recovered and that it provides a valuable feed or a feed supplement because of its mineral protein and fat content.

It is in general the object of the present invention to provide a process for the utilization of waste lettuce.

Another object of the present invention is to provide an animal and poultry feed material from lettuce.

Another object of the invention is to provide a process for the recovery of the suspended solid content carried in the liquid fraction of lettuce.

The invention includes other objects and features of advantage, some of which, together with the foregoing, will appear hereinafter wherein the present manner of practicing the invention is disclosed. The drawing is a diagrammatic representation of the present process.

Lettuce, either waste lettuce, cull heads, or the like, or surplus lettuce heads are passed to a disintegrator 6 wherein the lettuce is torn apart and thoroughly disintegrated so that the lettuce is in a suitable condition for dewatering. Thereafter the lettuce is passed to a press 7, such as a Louisville press, a screw press, or a combination of the two, wherein the water content is reduced. The solid content, containing about 55% water, is passed to a dryer 8 and a feed product is secured. This product is of rather a dark green color and has the appearance similar to alfalfa leaf meal. An approximate analysis of this material indicates the following composition:

| | Per cent |
|---|---|
| Protein | 13.94 |
| Fat | 3.74 |
| Fiber | 20.17 |
| Ash | 19.89 |
| Moisture | 5.93 |
| Carbohydrates, etc. | 36.33 |
| | 100.00 |

The over-all yield of this product is about 4% of the total weight of the lettuce processed.

The liquid fraction separated in the press 7 is green in color, and contains a large amount of suspended solids. I believe that these solids consist mainly of plastids. The solids are so suspended in the liquid that under usual operating conditions they cannot be recovered or separated. I have determined that these solids can be separated from the liquid and that they are of particular value. The separation of the solids can be effected by centrifuging the liquid fraction, by coagulating the solids with reagents to alter the pH to the iso-electric point, or else by heating the material until coalescence occurs. A temperature of 60°–100° C. usually suffices. Heating with steam in an open vessel is ordinarily sufficient. This last is preferred because of its simplicity and effectiveness.

Upon heating the liquid the suspended material collects on the top in the form of a cake. The remaining liquid is drained off from the cake and the sludge filtered in the press to remove most of the water. The collecting and separation of the solids is indicated at 10 in the drawing, while the filtration of the material is indicated by filter 9. The solid residue from the filter 9 is dried in a dryer 11. This material, when dry, is found to have approximately the following composition:

| | Per cent |
|---|---|
| Protein | 35 |
| Fat | 12 |
| Fiber | 2 |
| Ash | 10 |
| Moisture | 5 |
| Carbohydrates, etc. | 36 |
| | 100 |

In addition, the material is found to have a vitamin G content of about 5 gammas per gram.

This material can be used as such or added to another feed or to the dried lettuce feed previously mentioned.

The suspended solids are also useful as a carotin and chlorophyl source. These can be extracted by the usual methods of extraction.

I claim:

1. A process for manufacture of an animal feed from lettuce comprising disintegrating and pressing the lettuce to separate a liquid fraction therefrom containing suspended solids, separating said suspended solids from said fraction, and dewatering said solids to provide a feed material.

2. A process for manufacture of an animal feed from lettuce comprising disintegrating and pressing the lettuce to separate a liquid fraction therefrom containing suspended solids, heating said liquid fraction to cause said suspended solids to collect into a mass and separating said suspended solids from said fraction, and dewatering said solids to provide a feed material.

3. A process for manufacture of an animal feed from lettuce comprising mechanically disintegrating lettuce to form a solid fraction and a liquid fraction containing suspended solids, separating said liquid fraction from said solid fraction and recovering said suspended solids from said liquid fraction.

4. A process for manufacture of an animal feed from lettuce comprising mechanically disintegrating lettuce to form a solid fraction and a liquid fraction containing suspended solids, separating said liquid fraction from said solid fraction, heating said separated liquid fraction whereby said suspended solids collect on the surface of the liquid, and recovering said collected suspended solids.

HENRY A. SMITH.